United States Patent Office 3,557,192
Patented Jan. 19, 1971

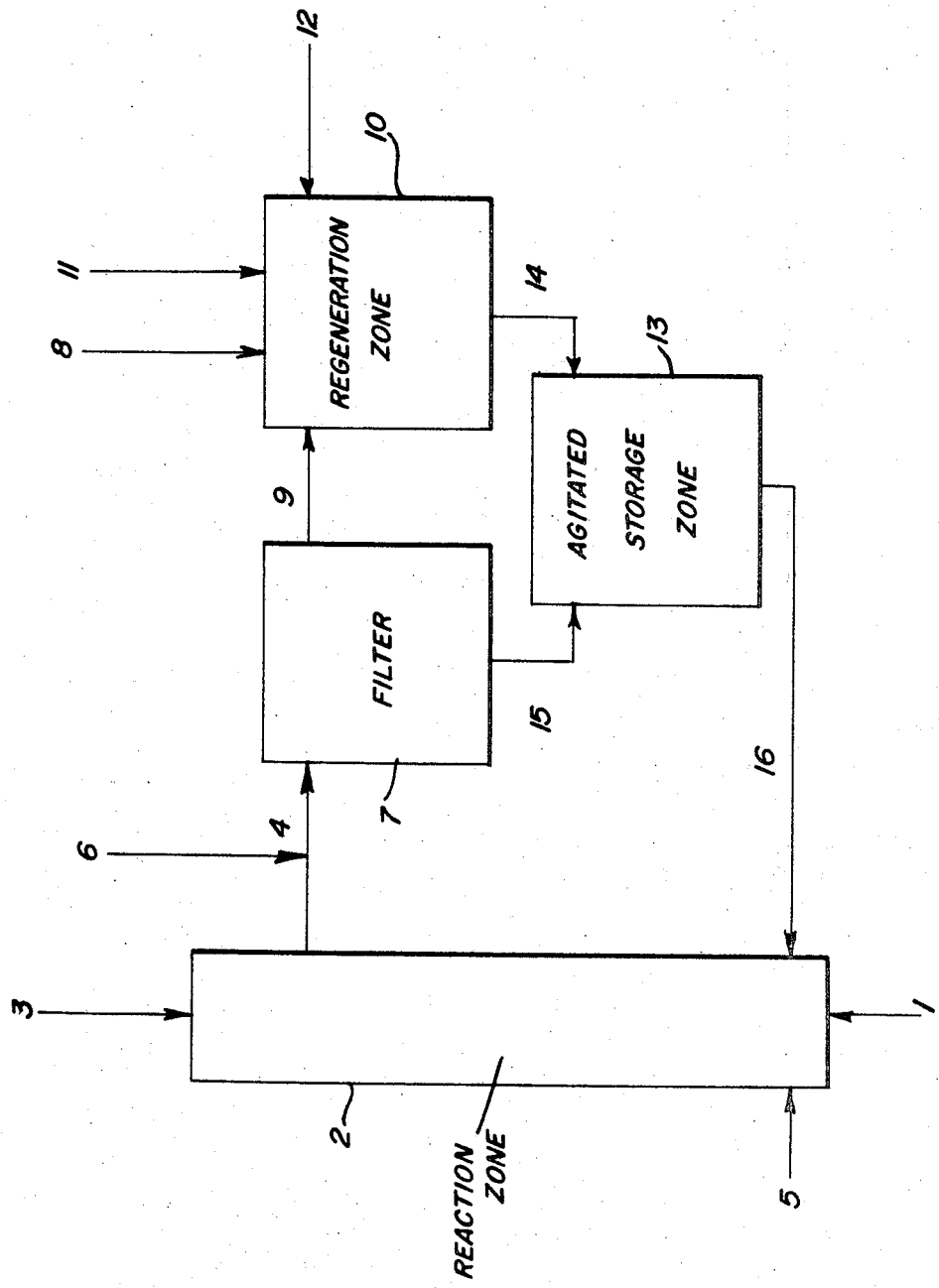

3,557,192
PROCESS FOR PREPARING UNSATURATED ESTERS
Melville E. D. Hillman, Rockville, Md., assignor to W. R. Grace & Co., New York, N.Y., a corporation of Connecticut
Filed Mar. 18, 1968, Ser. No. 713,763
Int. Cl. C07c 67/04
U.S. Cl. 260—497                                      5 Claims

ABSTRACT OF THE DISCLOSURE

A water-soluble catalyst consisting essentially of a noble metal halide, an alkali metal halide and a cupric halide is prepared and employed in a continuous process for preparing unsaturated esters. An initial, non-soluble catalyst charge is put into the reactor and, as this catalyst becomes reduced, it is continuously removed to be regenerated. The above mentioned water-soluble catalyst is continuously added as make-up catalyst until enough of the reduced catalyst has been regenerated, at which time addition of the aforesaid water-soluble catalyst is stopped and the regenerated catalyst is continuously added.

This invention relates to unsaturated esters and, more specifically, to a catalyst composition and process for preparing alkenyl acetate.

There has been a considerable amount of recent activity in the art of making unsaturated esters from olefins and organic acids. This activity has been stimulated primarily by the discovery that, under the proper conditions, palladium salts are reduced by ethylene to form $\pi$-complex species which further react with organic acids to yield vinyl esters and palladium metal. In the utilization of this reaction, the reduced palladium is oxidized to palladium (II) halide in a recycling step and subsequently reused.

It is well-known that divalent, anhydrous noble metal halides are relatively hydrophobic, i.e. insoluble in water, as are mixtures of divalent noble metal halides and copper (II) halides. Heretofore, the catalyst systems employed in the preparation of alkenyl esters from alkenes and organic acids have been insoluble mixtures of compounds such as palladium (II) chloride and other salts including alkali metal halides and acetates, and copper (II) halides and acetates. The previous catalysts have been, of necessity, charged to the reactor in slurried form, thereby requiring expensive apparatus to maintain the even dispersion of the solid catalyst particles. In such processes there is also an everpresent danger of solids agglomerating and clogging the system, thereby, requiring expensive maintenance and shutdown time.

Another characteristic of the systems previously described is the depletion of halide ion through the production of organic halides. In order to maintain the halide concentration at a constant level, it has heretofore been necessary to introduce hydrogen chloride to the reaction zone. This step is very undesirable due to the corrosive effect on the apparatus and to the increased formation of organic halides caused by the presence of the strong mineral acid.

I have now found a catalyst system which is completely soluble in water and which can be continuously added to a process merely by employing a simple pumping device, thus eliminating the costly equipment necessary for handling slurries and likewise eliminating those problems inherent to the addition of slurries, i.e. particle agglomeration with resultant clogging of the system and shutdown expense.

Further, the novel composition of the instant invention eliminates the necessity of adding hydrochloric acid to the reaction zone to refurbish the depleted halide ion.

In summary, this invention is directed to a composition which consists essentially of:

(a) A noble metal halide having a formula $MX_2$ where M is a noble metal selected from the group consisting of (i) ruthenium, (ii) rhodium, (iii) palladium, (iv) osmium, (v) iridium, and (vi) platinum and where X is a halide selected from the group consisting of (i) chloride, and (ii) bromide;

(b) An alkali metal halide of the formula MX where M is an alkali metal selected from the group consisting of (i) lithium, (ii) sodium, (iii) potassium, (iv) rubidium, and (v) cesium and where X is a halide selected from the group consisting of (i) chloride, and (ii) bromide; and (c) A copper halide having the formula $CuX_2$ where X is a halide selected from the group consisting of (i) chloride, and (ii) bromide;

The mole ratios being about 0.1 to 10 moles noble metal halide to 40 to 500 moles alkali metal halide to 10-250 moles copper (II) halide.

In one embodiment of this invention the mole ratios are about 0.2-3 moles noble metal halide to about 75 to 250 moles alkali metal halide to about 20 to 100 moles copper (II) halide.

In an embodiment of this invention the alkali metal halide is sodium chloride.

In an embodiment of this invention the alkali metal halide is potassium chloride.

In an embodiment of this invention the noble metal halide is palladium chloride.

A further embodiment of this invention is a continuous process for preparing alkenyl acetate, said acetate having from 4-8 carbon atoms per molecule, said process comprising:

(A) Starting said continuous process by:
(1) Charging a pressurizable reaction zone with a catalyst slurry, said slurry consisting essentially of (a) an alkali metal acetate selected from the group consisting of lithium acetate, sodium acetate, potassium acetate, rubidium acetate, and cesium acetate; (b) a copper (II) halide selected from the group consisting of copper (II) chloride and copper (II) bromide; (c) copper (II) acetate; (d) a noble metal halide having the formula $MX_2$ wherein M is a noble metal selected from the group consisting of ruthenium, rhodium, palladium, osmium, iridium, and platinum and X is a halide selected from the group consisting of chloride and bromide; and (e) acetic acid, the mole ratios being about 75-250 moles alkali metal acetate to about 10-50 moles copper (II) halide to about 10-50 moles copper (II) acetate to about 0.2-3 moles noble metal halide to 1,000 moles acetic acid;

(2) Continuously charging into said reaction zone a mixture of an alkene and gaseous oxygen, said alkene having 2-6 carbon atoms per molecule, said mixture being about 0.01-0.05 mole fraction of oxygen.

(3) Causing said mixture of alkene and gaseous oxygen to react with said catalyst slurry to form reaction products and spent catalyst slurry;

(4) Adding an aqueous catalyst solution to said reaction, said aqueous solution consisting essentially of:

(a) A noble metal halide having the formula $MX_2$ where M is a noble metal selected from the group consisting of (i) ruthenium, (ii) rhodium, (iii) palladium, (iv) osmium, (v) iridium, and (vi) platinum and where X is a halide selected from the group consisting of (i) chloride, and (ii) bromide;

(b) An alkali metal halide of the formula M'X where M' is an alkali metal selected from the group consisting of (i) sodium, (ii) potassium, (iii) rubidium, and (iv)

cesium and where X is a halide selected from the group consisting of (i) chloride, and (ii) bromide; and (c) A copper halide having the formula $CuX_2$ where X is a halide selected from the group consisting of (i) chloride, and ((ii) bromide;

(d) The mole ratios being about 0.1–10 moles noble metal halide to about 40–500 moles alkali metal halide to about 10–250 moles copper halide; while simultaneously removing the aforesaid spent catalyst slurry from said reaction zone, said aqueous catalyst solution being added at such a rate so as to maintain a nearly constant concentration of noble metal in the reaction zone.

(5) Continuously regenerating said spent catalyst slurry by:

(a) Removing organic residue therefrom, (b) Oxidizing the reduced noble metal to a noble metal halide having the formula $MX_2$ where M is a noble metal selected from the group consisting of (i) ruthenium, (ii) rhodium, (iii) palladium, (iv) osmium, (v) iridium, and (vi) platinum and where X is a halide selected from the group consisting of (i) chloride, and (ii) bromide, and (c) Converting organic copper salts to copper (II) halide, said halide being selected from the group consisting of (i) chloride and (ii) bromide;

(6) Collecting said regenerated catalyst solution in a storage zone until the amount of noble metal halide in said solution is about 1–6 times the amount of noble metal present in the reaction zone at any given time.

(B) Making said started process continuous by:

(1) Discontinuing the addition of aforesaid aqueous catalyst solution and simultaneous continuously adding regenerated catalyst solution at a rate sufficient to maintain a nearly constant concentration of noble metal in the reaction zone;

(2) Adding acetic acid to the reaction zone at a rate sufficient to maintain a nearly constant concentration of acetic acid in said reaction zone; and (3) Continuously removing and recovering gaseous reaction products from said reaction zone.

In an embodiment of this invention, said mixture of alkene and gaseous oxygen is charged into said reaction zone at a pressure of about 10–20 atmospheres.

In an embodiment of this invention the alkene is ethylene and the alkylene acetate is vinyl acetate.

In an embodiment of this invention, said noble metal halide used in the process described supra is palladium (II) chloride.

In an embodiment of this invention, said alkali metal halide used in the process described supra is potassium chloride.

In the drawing:

The drawing is a flow sheet of a preferred embodiment of the process of the instant invention wherein a mixture of alkene, typically ethylene and gaseous oxygen enters the process via conveying means 1 where it is dispersed into the catalyst-bearing liquid phase in the reaction zone 2, which can be a tower reactor fabricated from a metal of low corrosion susceptibility such as titanium or other relatively non-corrosive material such as non-corrosive metals and metal alloys, glass, porcelain, and other ceramic composiitons. As the gaseous components bubble upwards through the reaction zone, a certain portion of the alkene is oxidized by the catalyst-acetic acid slurry and converted to alkenyl acetate, while the unreacted gases sweep the product ester and other vaporizable components to be removed from the reaction zone 2 via conveying means 3 (a pipe or line).

Oxidation of the alkenyl component results in catalyst reduction and the thus depleted or reduced catalyst is continuously removed via conveyor means 4.

To maintain the rate of reaction, make-up catalyst solution is added at 5 in the form of an aqueous solution of noble metal halide, copper(II) halide, and alkali metal halide, e.g. palladium(II) chloride, copper(II) chloride and potassium chloride, as hereinbefore described. This solution is added at such a rate as to maintain a relatively constant concentration of noble metal in the reaction zone 2 said concentration being about 0.2–3 moles of noble metal per 1000 moles of acetic acid. Typically, this addition is carried on during an initial period of the process, during which time, spent catalyst removed at 4 undergoes regeneration. This period of addition of the make-up catalyst is hereinatfer referred to as "starting the continuous process."

Said regeneration comprises a process for removing organic residue, such as undefined tars from the spent catalyst oxidizing reduced noble metal present in the spent catalyst to its previous state of a noble metal halide, converting dibasic acid salts of copper, for example, copper oxalate to copper(II) halide.

This is typically achieved by (a) introducing dilute hydrochloric acid into the spent catalyst via conveying means 6; (b) filtering the spent catalyst mixture on a filter 7; (c) conveying the residue to regenteration zone 10 via conveying means 9; (d) digesting the residue in concentrated nitric acid until the catalyst residue-nitric acid mixture is thoroughly digested; (e) treating the thus digested mixture with concentrated hydrochloric acid via conveying means 11; (f) boiling to remove substantially all of the nitric acid; (g) treating the resultant mixture with formaldehyde, which is added via conveying means 12, to completely remove nitric acid and nitrate ion; (h) conveying the now regenerated aqueous catalyst solution to a storage zone 13 via conveying means 14, and adding the filtrate from (b), above, to the storage zone 13, thereby combining said filtrate with said aqueous regenerated catalyst solution.

When a sufficient amount of regenerated catalyst solution has been accumulated, addition of the aforementioned make-up catalyst solution at 5 is discontinued and the regenerated catalyst solution is continuously added to the reaction zone 2 via conveying means 16 at a rate approximating the rate of removal of spent catalyst via conveying means 4. Discontinuation of the make-up catalyst solution and continuous addition of regenerated catalyst solution is hereinafter referred to as "making the started process continuous."

The following examples are provided to illustrate the invention, but are in no way to be interpreted as limiting the scope of said invention:

EXAMPLE I

The following mixture of dry salts was prepared:

|  | G. |
|---|---|
| Palladium(II) chloride ($PdCl_2$) | 12 |
| Copper(II) chloride ($CuCl_2$) | 544 |
| Potassium chloride (KCl) | 726 |

This mixture was taken up in 6.3 liters of distilled water and found to be readily soluble therein.

EXAMPLE II

The procedure followed in Example I was repeated except the dry mixture consisted essentially of:

|  | G. |
|---|---|
| Palladium(II) chloride ($PdCl_2$) | 12 |
| Copper(II) chloride ($CuCl_2$) | 725 |
| Potassium chloride (KCl) | 988 |

This mixture was found to be soluble in 6.3 liters of distilled water.

EXAMPLE III

The procedure followed by Example I was repeated except the dry mixture consisted of:

|  | G. |
|---|---|
| Palladium(II) chloride ($PdCl_2$) | 12 |
| Copper(II) chloride ($CuCl_2$) | 363 |
| Potassium chloride (KCl) | 494 |

This mixture was found to be soluble in 6.3 liters of distilled water.

EXAMPLE IV

A continuous process for preparing vinyl acetate was started by charging a tower reactor made of titanium with six liters of a catalyst slurry having the following composition:

| Component: | Moles |
|---|---|
| Acetic acid | 1000 |
| $PdCl_2$ | 1 |
| $CuCl_2$ | 30 |
| Copper(II) acetate | 30 |
| Potassium acetate | 100 |

The reactor was heated to 120° C. and an ethylene-oxygen mixture, the oxygen content of which being 3 mole percent, was fed into the reactor at the bottom and bubbled through the catalyst slurry. After a pressure of 40 atmospheres had been attained within the reactor, the vapor phase at the top of the reactor was removed at a rate sufficient to maintain the internal reactor pressure at 40 atmospheres.

After about 3 hours of reaction time, spent catalyst mixture was removed from the reactor at about 5% per hour and this spent catalyst was subjected to a regeneration procedure (described infra).

To adjust for the catalyst removed from the reactor an equal amount of fresh catalyst solution was continuously fed into the reactor. This catalyst solution was prepared by dissolving in 6,324 g. of distilled water the following:

| | G. |
|---|---|
| $PdCl_2$ | 12 |
| $CuCl_2$ | 544 |
| KCl | 726 |

The removed vapor phase contained 3.6 moles 1 liter 1 hour of vinylacetate and 2.7 moles 1 liter 1 hour of acetaldehyde as averaged over a 72 hour period.

As used herein, the term "dilute aqueous hydrochloric acid" is to be construed as meaning a solution containing about 0.5–6 moles of hydrogen chloride per liter of aqueous solution.

As used herein, the term "concentrated aqueous nitric acid" is to be construed as meaning an aqueous solution of about 10–18 moles of $HNO_3$ per liter of solution.

As used herein, the term "concentrated aqueous hydrochloric acid" is to be construed as meaning an aqueous solution of about 7–15 moles hydrogen chloride per liter of solution.

I claim:

1. A continuous process for preparing an alkenyl acetate, said acetate having from 4–8 carbon atoms per molecule, said process comprising:

(A) starting said continuous process by:
(1) charging a pressurizable reaction zone with a catalyst slurry, said slurry consisting essentially of (a) an alkali metal acetate selected from the group consisting of lithium acetate, sodium acetate, potassium acetate, rubidium acetate, and cesium acetate; (b) a copper(II) halide selected from the group consisting of copper(II) chloride and copper(II) bromide; (c) copper(II) acetate; (d) a noble metal halide having the formula $MX_2$ wherein M is a noble metal selected from the group consisting of ruthenium, rhodium, palladium, osmium, iridium, and platinum and X is a halide selected from the group consisting of chloride and bromide; and (e) acetic acid, the mole ratios being about 75–250 moles alkali metal acetate to about 10–50 moles copper(II) halide to about 10–50 moles copper(II) acetate to about 0.2–3 moles noble metal halide to 1,000 moles acetic acid;

(2) continuously charging into said reaction zone a mixture of an alkene and gaseous oxygen, said alkene having 2–6 carbon atoms per molecule, said mixture being about 0.01–0.05 mole fraction of oxygen while maintaining the temperature of the slurry within said reaction zone at a temperature of about 100–150° C.; whereby said mixture of alkene and gaseous oxygen is reacted with said catalyst slurry in said reaction zone to form reaction products and spent catalyst slurry, said spent catalyst slurry comprising organic residue, reduced noble metal, and organic copper salts;

(3) continuously adding a first aqueous catalyst solution to said reaction zone said aqueous solution consisting essentially of: (a) a noble metal halide having the formula $MX_2$ wherein M is a noble metal selected from the group consisting of ruthenium, rhodium, palladium, osmium, iridium, and platinum and where X is a halide selected from the group consisting of chloride, and bromide; (b) an alkali metal halide of the formula M'X where M' is an alkali metal selected from the group consisting of sodium, potassium, rubidium, and cesium and where X is a halide selected from the group consisting of chloride, and bromide; and (c) a copper halide having the formula $CuX_2$ where X is a halide selected from the group consisting of chloride, and bromide, the mole ratios being about 0.1–10 moles noble metal halide to 40–500 moles alkali metal halide to 10–250 moles copper(II) halide; the copper(II) halide concentration of the first aqueous catalyst solution being about 6–13 moles per liter, while simultaneously continuously removing the aforesaid spent first catalyst slurry from said reaction zone, said aqueous catalyst solution being added at such a rate so as to maintain a nearly constant concentration of noble metal halide in the reaction zone;

(4) continuously regenerating said spent catalyst slurry by (a) adding dilute aqueous hydrochloric acid to said spent catalyst slurry; (b) separating said slurry to obtain a solid phase and a separated solution; (c) treating said solid phase with concentrated aqueous nitric acid solution to dissolve the solid phase; (d) treating the thus dissolved solid phase with concentrated aqueous hydrochloric acid and boiling the resulting mixture to obtain a solution virtually free of nitric acid; (e) treating the thus obtained solution with formaldehyde to produce a regenerated catalyst solution; (f) forming a second aqueous catalyst solution by combining said regenerated catalyst solution with the aforesaid separated solution;

(5) collecting said second aqueous catalyst solution in a storage zone until the moles of noble metal halide in said solution is about 1-6 times the moles of noble metal present in the reaction zone; and (B) Making the thus started process continuous by:
(1) discontinuing the addition of the aforesaid aqueous catalyst solution and simultaneously continuously adding regenerated catalyst solution at a rate sufficient to maintain a nearly constant concentration of noble metal in the reaction zone;

(2) adding acetic acid to the reaction zone at a rate sufficient to maintain a nearly constant quantity of acetic acid in said reaction zone; and (3) continuously removing and recovering gaseous reaction products from said reaction zone.

2. The process of claim 1 wherein said mixture of alkene and gaseous oxygen is charged into said reaction zone at a pressure of from about 10 to 60 atmospheres.

3. The process of claim 2 in which the alkene is ethylene and the alkenyl acetate is vinyl acetate.

4. The process of claim 2 in which the noble metal halide is palladium(II) chloride.

5. The process of claim 2 in which the alkali metal halide is potassium chloride.

References Cited

UNITED STATES PATENTS

| | | | |
|---|---|---|---|
| 3,210,152 | 10/1965 | Van Helden et al. | 260—497 |
| 3,420,873 | 1/1969 | Olivier | 260—497 |
| 3,441,601 | 4/1969 | Sennewald et al. | 260—497 |
| 3,463,740 | 8/1969 | Ketley et al. | 252—416 |

LORRAINE A. WEINBERGER, Primary Examiner

V. GARNER, Assistant Examiner

U.S. Cl. X.R.

252—413, 441